US008725966B2

(12) United States Patent
Huber et al.

(10) Patent No.: US 8,725,966 B2
(45) Date of Patent: May 13, 2014

(54) GENERATION AND UPDATE OF STORAGE GROUPS CONSTRUCTED FROM STORAGE DEVICES DISTRIBUTED IN STORAGE SUBSYSTEMS

(75) Inventors: Harold Steven Huber, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 12/178,176

(22) Filed: Jul. 23, 2008

(65) Prior Publication Data

US 2010/0023725 A1    Jan. 28, 2010

(51) Int. Cl.
*G06F 12/00* (2006.01)

(52) U.S. Cl.
USPC ............................ 711/162; 711/114; 711/173

(58) Field of Classification Search
USPC .......................................... 711/114, 173, 162
See application file for complete search history.

(56) References Cited

U.S. PATENT DOCUMENTS

| 5,651,133 | A * | 7/1997 | Burkes et al. ................. 711/114 |
|---|---|---|---|
| 5,664,187 | A * | 9/1997 | Burkes et al. ................. 711/114 |
| 5,696,934 | A * | 12/1997 | Jacobson et al. ............. 714/5.11 |
| 5,802,553 | A * | 9/1998 | Robinson et al. ............. 711/103 |
| 6,266,784 | B1 * | 7/2001 | Hsiao et al. ..................... 714/6.3 |
| 6,883,065 | B1 * | 4/2005 | Pittelkow et al. ............. 711/114 |
| 7,069,295 | B2 | 6/2006 | Sutherland et al. |
| 7,103,740 | B1 * | 9/2006 | Colgrove et al. ............. 711/162 |
| 7,146,481 | B2 | 12/2006 | Krehbiel, Jr. et al. |
| 7,243,103 | B2 | 7/2007 | Murphy et al. |
| 2002/0175938 | A1 | 11/2002 | Hackworth |
| 2004/0002812 | A1 | 1/2004 | Yamanaka |
| 2005/0071584 | A1 * | 3/2005 | Griffin et al. .................. 711/162 |
| 2005/0149673 | A1 * | 7/2005 | Suzuki et al. ................. 711/114 |
| 2006/0129770 | A1 * | 6/2006 | Martin et al. ................. 711/162 |
| 2006/0161753 | A1 | 7/2006 | Aschoff et al. |
| 2007/0043787 | A1 * | 2/2007 | Cannon et al. ................ 707/203 |
| 2007/0198328 | A1 | 8/2007 | Fuller et al. |

* cited by examiner

*Primary Examiner* — Larry MacKall
(74) *Attorney, Agent, or Firm* — Konrad Raynes Davda & Victor LLP; Rabindranath Dutta

(57) ABSTRACT

A plurality of storage subsystems and a plurality of storage devices are maintained, and wherein each storage subsystem includes at least one storage device of the plurality of storage devices. A plurality of storage groups is generated, wherein each storage group includes one or more storage devices selected from the plurality of storage devices, and wherein the one or more storage devices selected in each storage group are included in at least two different storage subsystems. The plurality of storage groups is adjusted based on: (a) usage statistics of the data, wherein the usage statistics are stored in a log file; and (b) properties and organization of the data stored in a plurality of data structures.

16 Claims, 8 Drawing Sheets

GENERATION AND UPDATE OF STORAGE GROUPS CONSTRUCTED FROM STORAGE DEVICES DISTRIBUTED IN STORAGE SUBSYSTEMS

BACKGROUND

1. Field

The disclosure relates to a method, system, and article of manufacture for the generation and update of storage groups constructed from storage devices distributed in storage subsystems.

2. Background

In certain system managed storage environments, storage administrators may manually set up and maintain storage classes, storage groups, data classes and management classes in order to assist in the management of the storage requirements of large storage systems. Additionally with storage subsystems becoming larger and larger and as customers move from one storage subsystem to another, the size and location of the volumes within a storage group may need to be adjusted. A significant number of personnel may have to be deployed to perform the manual adjustments needed for the management of a large storage system.

SUMMARY OF THE PREFERRED EMBODIMENTS

Provided are a method, a system, an article of manufacture, and a method for deploying computing infrastructure, wherein a plurality of storage subsystems and a plurality of storage devices are maintained, and wherein each storage subsystem includes at least one storage device of the plurality of storage devices. A plurality of storage groups is generated, wherein each storage group includes one or more storage devices selected from the plurality of storage devices, and wherein the one or more storage devices selected in each storage group are included in at least two different storage subsystems. The plurality of storage groups is adjusted based on: (a) usage statistics of data, wherein the usage statistics are stored in a log file; and (b) properties and organization of the data stored in a plurality of data structures.

In certain embodiments, the at least two different subsystems comprise a first storage subsystem and a second storage subsystem. A primary data set is maintained in a storage group. A backup data set is maintained in the storage group, wherein the backup data set stores a copy of data stored in the primary data set, and wherein the primary data set is stored in the first storage subsystem and the backup data set is stored in the second storage subsystem.

In certain additional embodiments, the adjusting of the plurality of storage groups is performed in response to: (i) addition of new storage devices in the plurality of storage subsystems; (ii) updated storage requirements indicated by a user; and (iii) an analysis of the log file that maintains the usage statistics, wherein the analysis of the log file provides an indication that the adjusting of the plurality of storage groups is desirable.

In further embodiments, the adjusting of the plurality of storage groups further comprises: (i) changing an amount of storage space in the storage groups; (ii) adding or removing one or more selected storage devices from the storage groups; (iii) replacing at least one storage device in the storage groups; and (iv) adding new storage groups.

In yet further embodiments, the plurality of data structures comprises storage management system constructs that include a plurality of storage classes, a plurality of data classes, and a plurality of management classes. A storage group is selected from the plurality of storage groups for the data to be written. The plurality of storage classes is generated from the log file, wherein a storage class provides at least a first indicator that indicates whether the data is critical. The plurality of data classes is generated from the log file, wherein a data class provides at least a second indicator that indicates whether the data is compressed. The plurality of management classes is generated from the log file, wherein a management class provides at least a third indicator that indicates whether the data is to be backed up.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Generation, Update, and Display of Storage Groups

In certain embodiments an automated utility may query and discover the storage devices available to a system and may automatically group the storage devices into storage groups in pre-defined sizes and across a pre-defined number of subsystems. Additionally the utility may set up data classes, storage classes and management classes. As new direct access storage devices (DASD) are added or new storage requirements are determined the storage groups may be automatically adjusted.

In certain embodiments, users are provided with a graphical user interface (GUI) based application in which the users may input information, such as, how many storage groups are needed, how much DASD capacity needs to be assigned to the storage groups, etc. Scanning operations that may be performed in a storage system and based on the scanning operations a user may be shown how much DASD capacity is available to the user. The GUI may pictorially represent the DASD available. The GUI may also display how DASDs are assigned to different storage groups.

The automated utility may indicate to the user when a storage group is close to being filled up, and the automated utility may perform user defined tasks based on this information. Since the automated utility may store how much DASD is already defined for each subsystem, the automated utility may be able to define more DASD if additional DASD is available. The automated utility may send an alert to the user if pre-defined limits are reached and there is no more DASD to define to the host.

Additionally with the scan of records the automated utility may be able to set up other attributes, such as, management classes, data classes, storage classes, etc. The automated utility may determine what jobs are executed in the system and what data and how much data are created by those jobs. The automated utility may also determine how the data is managed, how quickly the data is migrated, how many backup versions of the data are kept, etc.

In certain additional embodiments, primary data sets and backup data sets are defined within each storage group. Users may also be able to add to this list of data sets through the GUI. These data sets may be defined and maintained on separate volumes and possibly on different DASD subsystems in order to reduce a single point of failure.

Exemplary Embodiments

Figure 1:
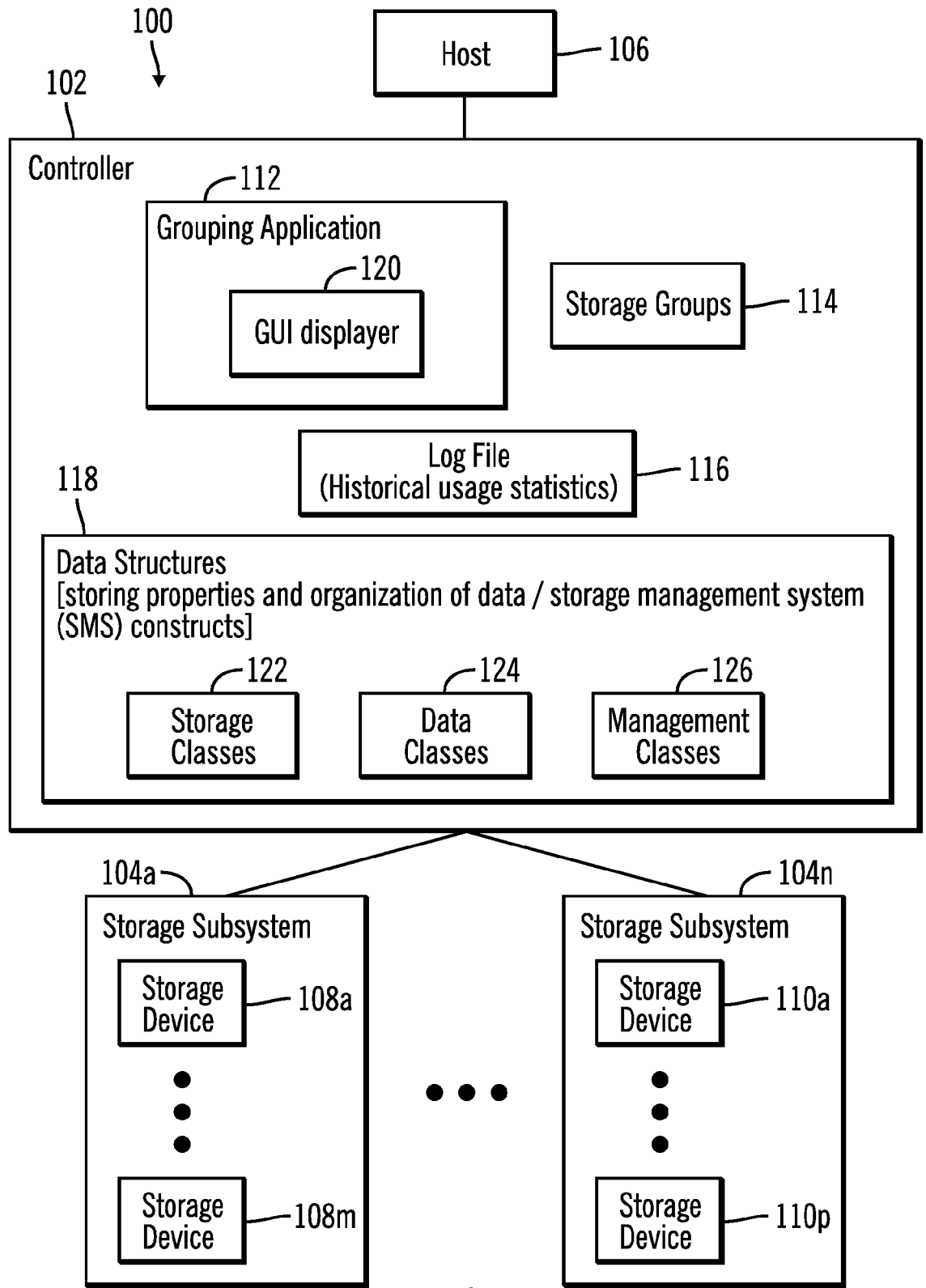
FIG. 1 illustrates a block diagram of a computing environment in which a controller is shown coupled to a plurality of storage subsystems and a host, in accordance with certain embodiments.

FIG. 1 illustrates a block diagram of a computing environment 100 in which a controller 102 is shown coupled to a plurality of storage subsystems 104a . . . 104n and a host 106, in accordance with certain embodiments. The controller 102 and the host 106 may comprise any suitable computational device known in the art, such as, a personal computer, a mainframe computer, a midrange computer, a storage controller, a library manager, a telephony device, a handheld computer, etc. Each of the plurality of storage subsystems 104a . . . 104n may include one or more storage devices 108a . . . 108m, 110a . . . 110p. The storage devices 108a . . . 108m, 110a . . . 110p may comprise any suitable storage device known in the art, such as, a disk storage device, an optical storage device, etc.

The controller 102 includes a grouping application 112, a plurality of storage groups 114, a log file 116, and data structures 118 that store properties and organization of data, wherein the data structures 118 may also be referred to as storage managements system (SMS) constructs.

The grouping application 112 includes a graphical user interface (GUI) displayer 120 that may display various characteristics of the storage groups 114, information derived from the log file 116, and information derived from the data structures 118, to a user. The data structures 118 may include storage classes 122, data classes 124, and management classes 126. While storage classes 122, data classes 124, and management classes 126 may provide a lot of information to a user, in certain exemplary embodiments an exemplary storage class 122 may indicate whether certain data is critical data, an exemplary data class 124 may indicate the data is compressed, an exemplary management class 126 may indicate whether the data is to be backed up.

Figure 2:
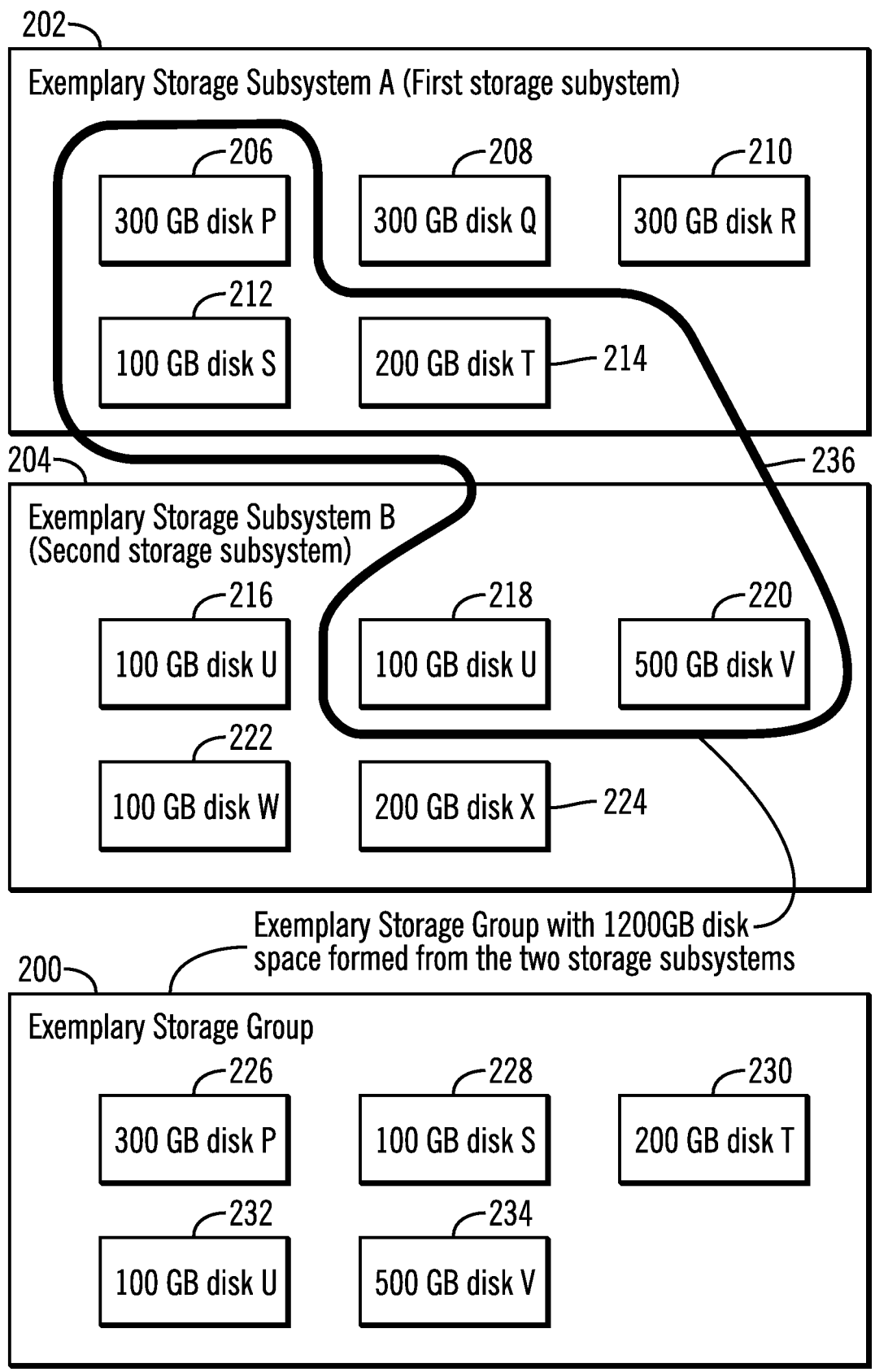
FIG. 2 shows a block diagram of an exemplary group generated from a plurality of exemplary storage subsystems, in accordance with certain embodiments.

FIG. 2 shows a block diagram of an exemplary storage group 200 generated from a plurality of exemplary storage subsystems 202, 204 selected from the storage subsystems 104a . . . 104n that are shown in FIG. 1, in accordance with certain embodiments. The exemplary storage group 200 of FIG. 2 may belong to the storage groups 114 shown in FIG. 1.

In FIG. 2, exemplary storage subsystem A (reference numeral 202) includes six disks 206, 208, 210, 212, 214 with storage capacities as indicated in FIG. 2. Exemplary storage subsystem B (reference numeral 204) includes five disks 216, 218, 220, 222, 224 with storage capacities as indicated in FIG. 2.

The grouping application 112 may select the 300 GB disk P (reference numeral 206), the 100 GB disk S (reference numeral 212), and the 200 GB disk T (reference numeral 214) from exemplary storage subsystem 202, and may select the 100 GB disk U (reference numeral 218) and the 500 GB disk V (reference numeral 220) from the exemplary storage subsystem 204, wherein the selected disks are shown encircled (reference numeral 236) in FIG. 2. The selected disks from the exemplary storage subsystems A and B (reference numerals 202, 204) are included in the exemplary storage group 200, where the selected disks are shown via reference numerals 226, 228, 230, 232, 234 within the exemplary storage group 200.

Therefore, FIG. 2 illustrates certain embodiments in which exemplary storage groups are formed by selecting storage devices from a plurality of storage subsystems. While in FIG. 2 only two exemplary storage subsystems are shown as contributing disks to a storage group, in alternative embodiments a fewer or a greater number of exemplary storage subsystems may contribute disks to storage group.

Figure 3:
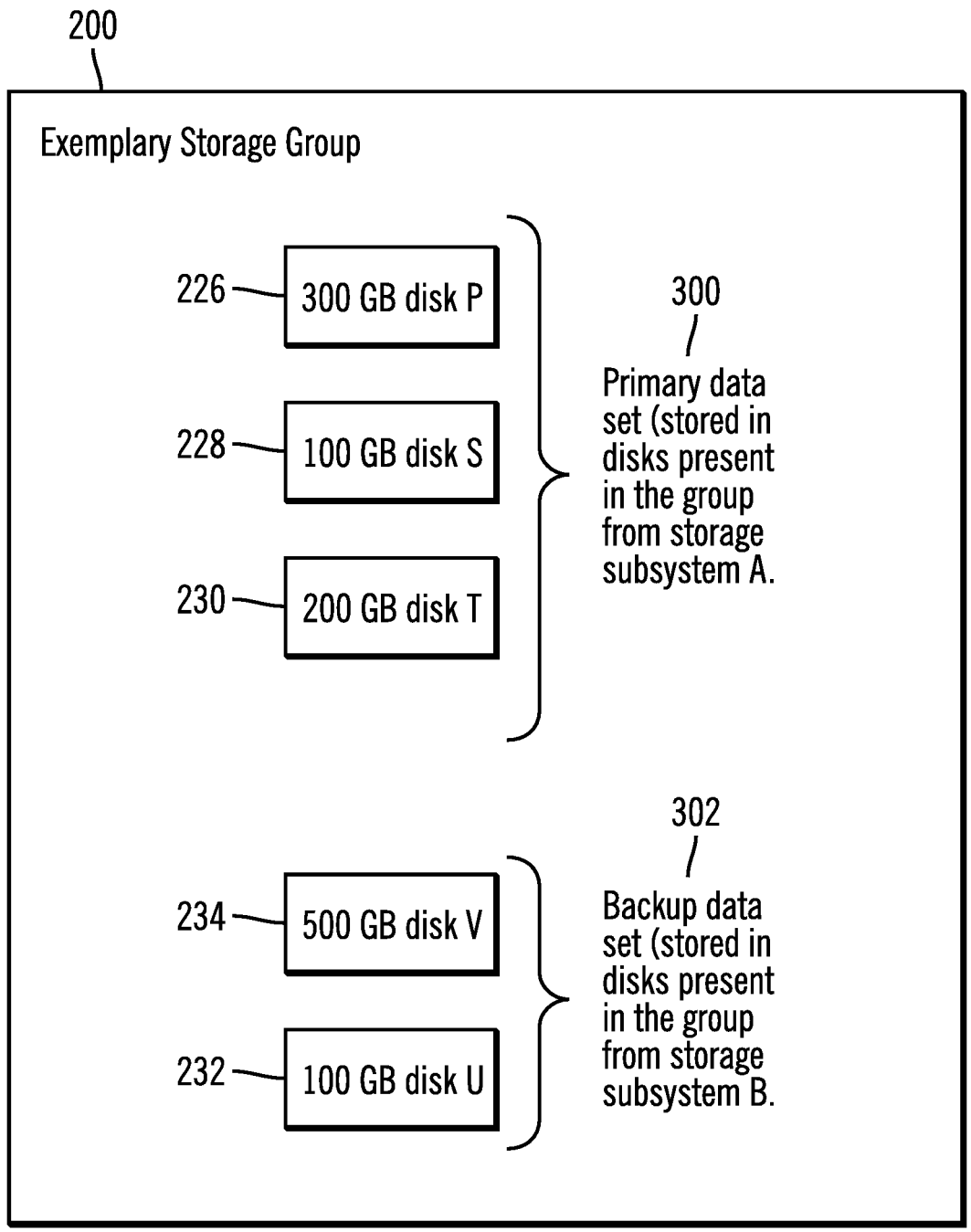
FIG. 3 illustrates a block diagram of an exemplary group with a primary data set and a backup data set, in accordance with certain embodiments.

FIG. 3 illustrates a block diagram of the exemplary group 200 (shown earlier in FIG. 2) with a primary data set 300 and a backup data set 302, in accordance with certain embodiments.

The disks 226, 228, 230 selected from the storage subsystem A 202 are assigned to storing the primary data set 300 and the disks 232, 234 selected from the storage subsystem B 204 are assigned to storing the backup data set 302.

Therefore FIG. 3 shows maintaining a primary data set 300 in a storage group 200 and also maintaining a backup data set 302 in the storage group 200, wherein the backup data set 302 stores a copy of data stored in the primary data set 300. The primary data set 300 and the backup data set 302 are stored in different storage subsystems. As a result, a failure of a subsystem does not cause both the primary data set 300 and the backup data set 302 to be unavailable.

Figure 4:
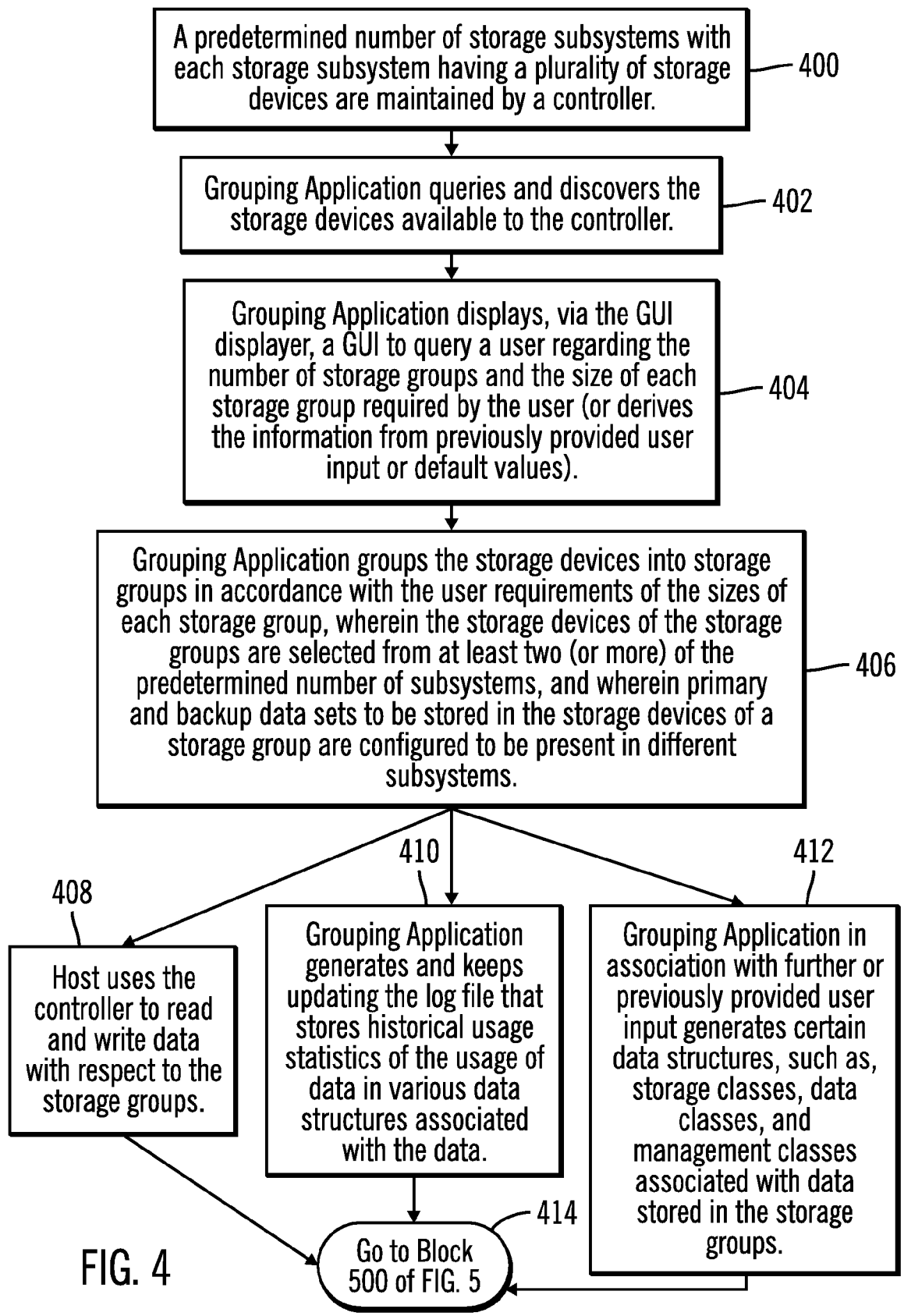
FIG. 4 illustrates a flowchart that shows first operations, in accordance with certain embodiments.

FIG. 4 illustrates a flowchart that shows first operations, in accordance with certain embodiments. In certain operations the first operations may be implemented in the controller 102 of the computing environment 100.

Control starts at block 400, in which a predetermined number of storage subsystems 104a . . . 104n with each storage subsystem having a plurality of storage devices (e.g., 108a . . . 108m, 110a . . . 110p) are maintained by a controller 102. The grouping application 112 queries and discovers (at block 202) the storage devices 108a . . . 108m, 110a . . . 110p available to the controller 102.

Control proceeds to block 404, in which the grouping application 112 displays, via the GUI displayer 120, a GUI to query a user regarding the number of storage groups and the size of each storage group required by the user. In certain embodiments, the grouping application 112 may derive the information on the number of storage groups and the size of each storage group required by the user from previously provided user inputs or default values. The grouping application 112 then groups (at block 406) the storage devices 108a . . . 108m, 110a . . . 110p into storage groups 114 in accordance with the user requirements for the size of each storage group. The storage devices of the storage groups 114 are selected from at least two (or more) of the predetermined number of subsystems, and wherein primary and backup data sets (e.g., shown by reference numerals 300, 302) to be stored in the storage devices of a storage group are configured to be present in different subsystems.

From block 406, control proceeds in parallel to blocks 408, 410, and 412. At block 408, the host 106 uses the controller 102 to read and write data with respect to the storage groups 1 14. The grouping application 112 generates and keeps updating (at block 410) the log file 116 that stores historical usage statistics of the usage of data in various data structures associated with the data. Furthermore, the grouping application 112 in association with further or previously provided user input generates certain data structures 118 also referred to as SMS constructs, such as, storage classes, data classes, and management classes associated with the data stored in the storage groups 1 14. From blocks 408, 410, and 412 control proceeds to block 414 in which control is transferred to block 500 of FIG. 5.

Figure 5:
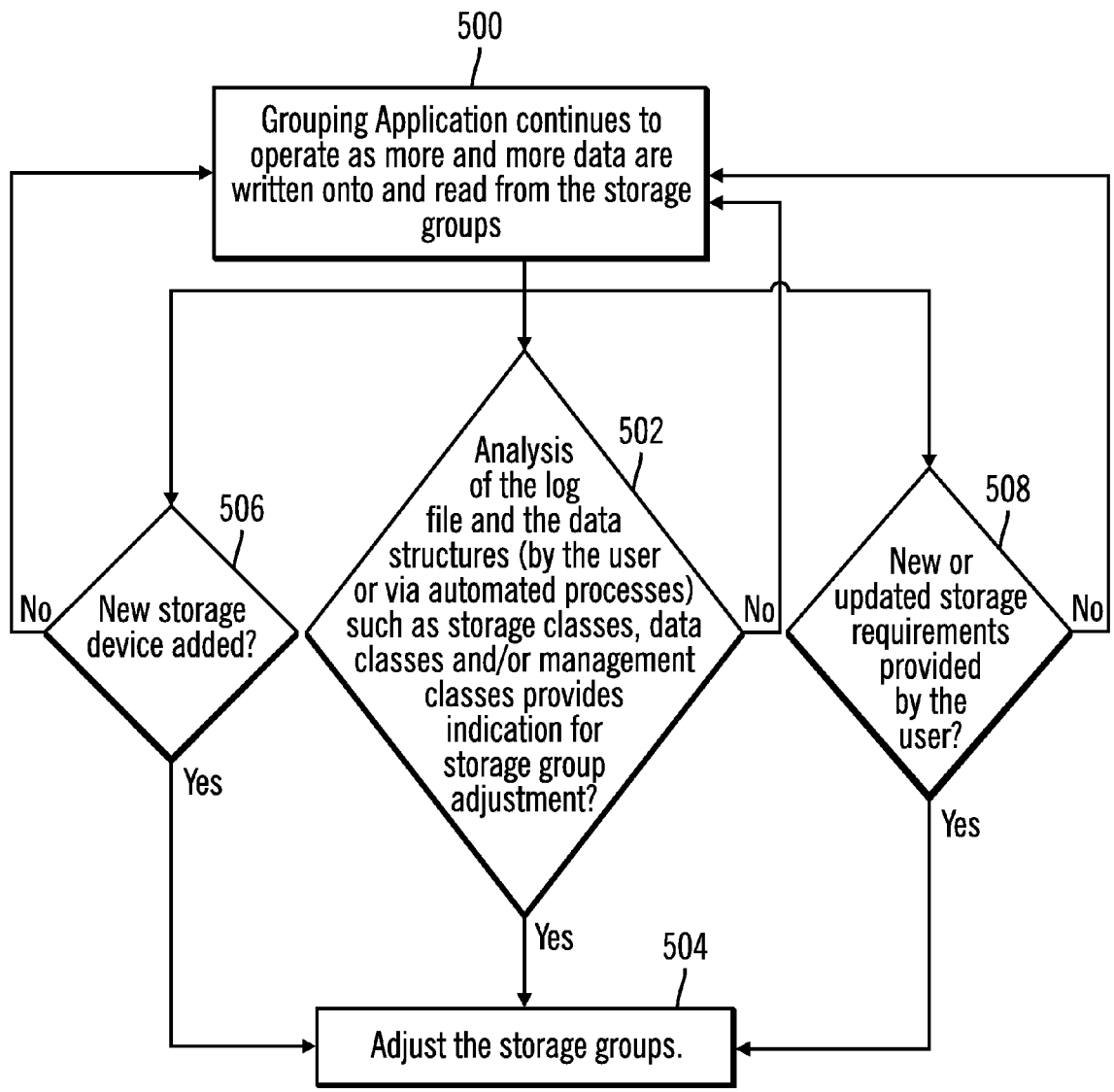
FIG. 5 illustrates a flowchart that shows second operations, in accordance with certain embodiments.

FIG. 5 illustrates a flowchart that shows second operations, in accordance with certain embodiments. In certain operations the second operations may be implemented in the controller 102 of the computing environment 100.

After control is transferred to block 500 of FIG. 5 from block 414 of FIG. 4, the grouping application 112 continues to operate as more and more data are written onto and read from the storage groups 114. Control proceeds to block 502 in which a determination is made as to whether an analysis of the log file 116 and the data structures 118 (wherein the data structures may include storage classes, data classes and/or management classes) performed by the user or via automated means provides indication for adjusting the storage groups 114. If so, control proceeds to block 504, where adjustments are made to the storage groups 114. If not, control returns to block 500.

Control may also be transferred from block 500 to block 506, wherein at block 506 a determination is made as to whether a new storage device has been added. If so, control proceeds to block 504, where adjustments are made to the storage groups 114. If not, control returns to block 500.

Additionally, control may also be transferred from block 500 to block 508, wherein at block 508 a determination is made as to whether new or updated storage requirements are provided by the user. If so, control proceeds to block 504, where adjustments are made to the storage groups 114. If not, control returns to block 500.

Therefore FIG. 5 illustrates certain embodiments in which adjustments are made to the storage groups 114 in response to: (i) addition of new storage devices in the plurality of storage subsystems 104a . . . 104n; (ii) updated storage requirements indicated by a user; and (iii) an analysis of the log file 116 that maintains historical usage statistics, wherein the analysis of the log file 116 provides an indication that the adjusting of the plurality of storage groups is desirable.

In certain embodiments the adjusting of storage groups 114 may include changing an amount of storage space in the storage groups 114, adding or removing one or more selected storage devices from the storage groups 114, replacing at least one storage device in the storage groups 114, and adding new storage groups.

Figure 6:
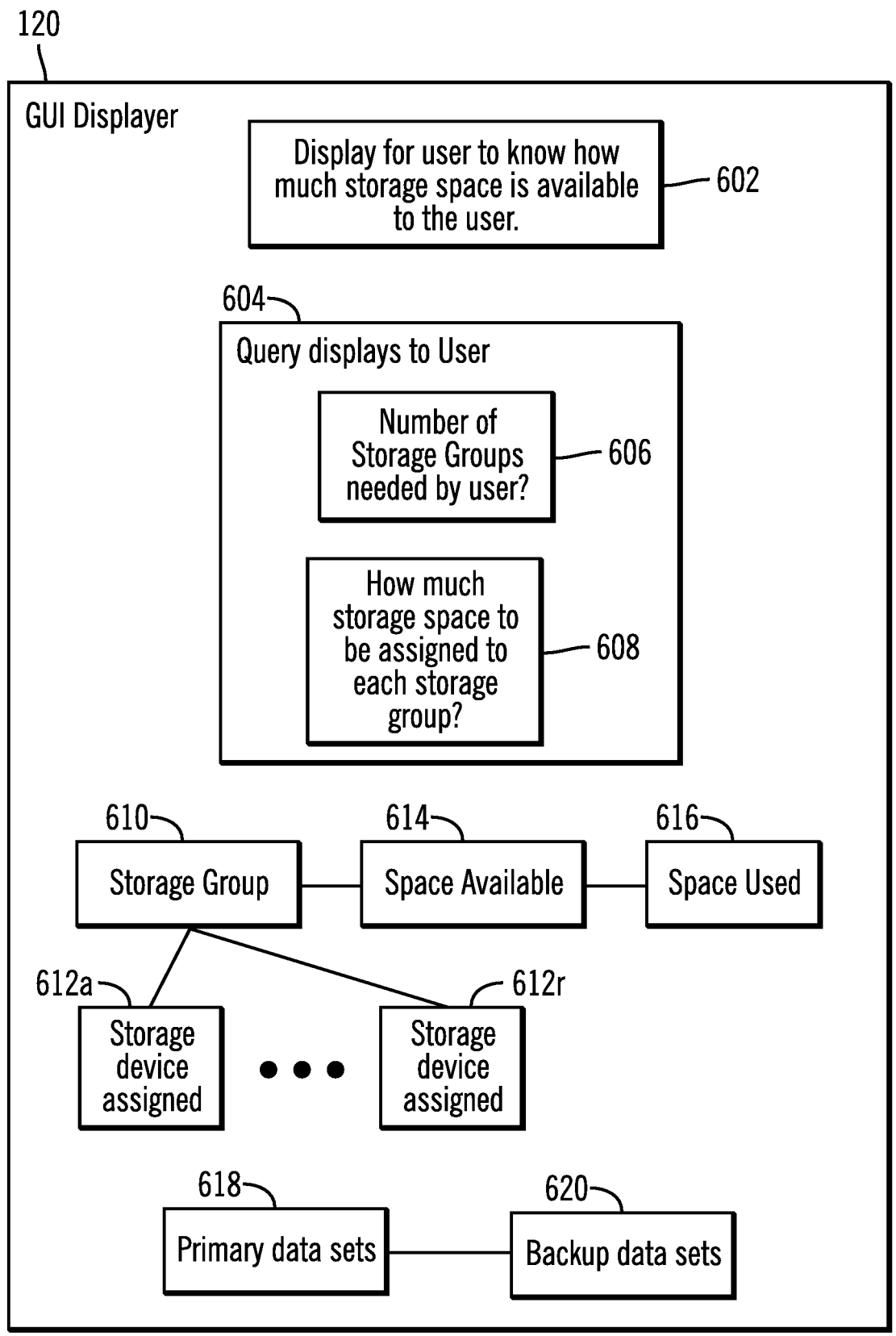
FIG. 6 illustrates a block diagram of a graphical user interface displayer, in accordance with certain embodiments.

FIG. 6 illustrates a block diagram of the graphical user interface displayer 120 (shown earlier in FIG. 1) included in the grouping application 112 that executes in the controller 102, in accordance with certain embodiments.

The GUI displayer 120 may present a display 602 that provides an indication to a user about the amount of storage space that is available to the user. The GUI display 120 may present query displays 604 to the user, wherein the query display 604 may request the user to indicate the number of storage groups needed by the user (reference numeral 606) and may also request the user indicate how much storage space (reference numeral 608) should be assigned to each storage group of the plurality of storage groups 114.

The GUI displayer 120 may also indicate for each storage group 610 the storage devices 612a . . . 612r assigned to the storage group, wherein the space available 614 in the storage group 610 and the space used 616 in the storage group 610 may also be indicated. The GUI displayer 120 may also indicate the primary data sets 618 and the backup data sets 620 and the storage devices that are included in the primary data sets 618 and the backup data sets 620 of a group. The information displayed by the GUI displayer 120 may be used by the user to modify the storage groups.

Figure 7:
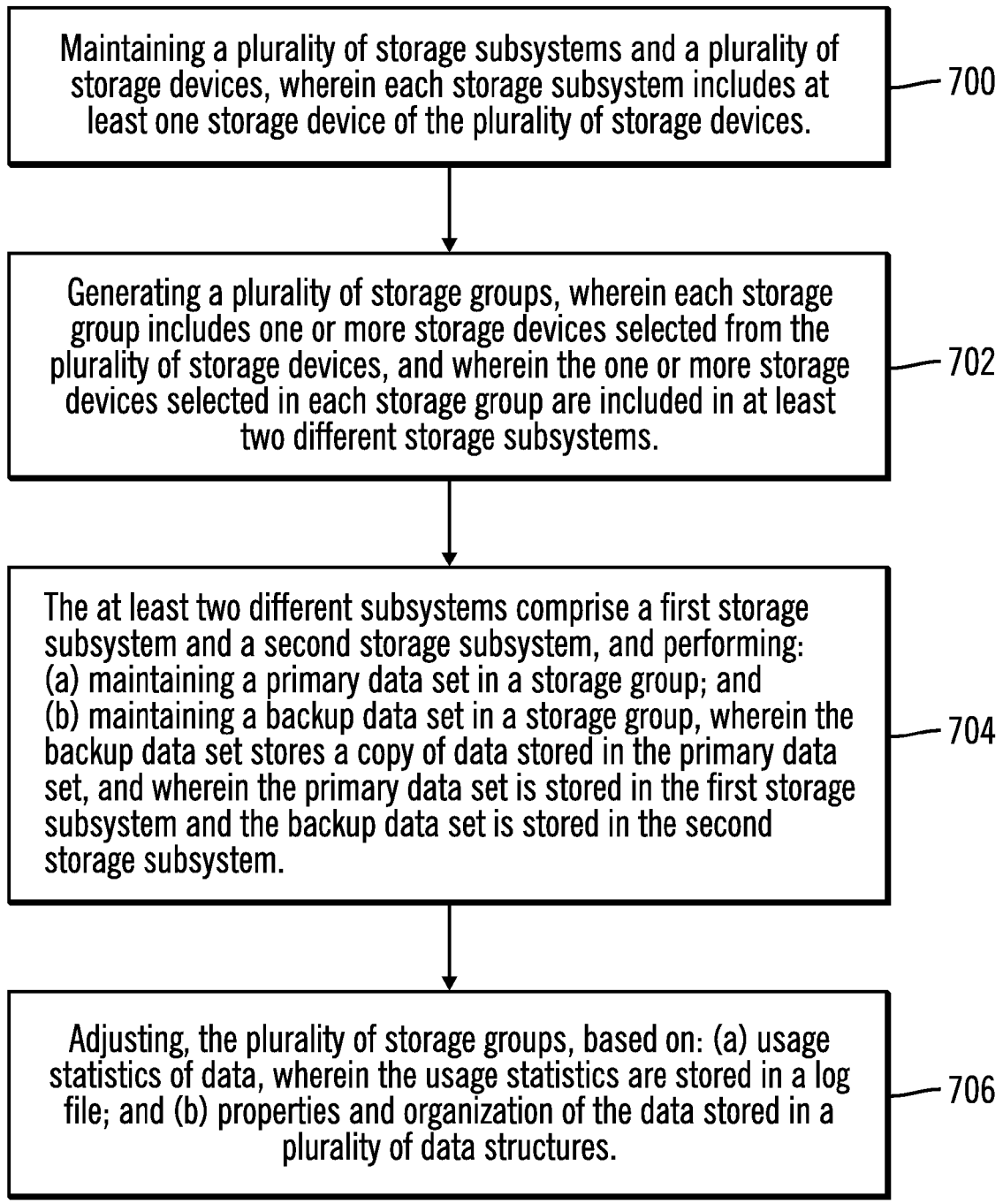
FIG. 7 illustrates a flowchart that shows third operations, in accordance with certain embodiments.

FIG. 7 illustrates a flowchart that shows third operations, in accordance with certain embodiments. In certain operations the third operations may be implemented in the controller 102 of the computing environment 100.

Control starts at block 700 in which a plurality of storage subsystems 104a . . . 104n and a plurality of storage devices 108a . . . 108m, 110a . . . 110p are maintained, and wherein each storage subsystem includes at least one storage device of the plurality of storage devices 108a . . . 108m, 110a . . . 110p.

A plurality of storage groups 114 is generated (at block 702), wherein each storage group includes one or more storage devices selected from the plurality of storage devices 108a . . . 108m, 110a . . . 110p, and wherein the one or more storage devices selected in each storage group are included in at least two different storage subsystems.

Control proceeds to block 704 in which the at least two different subsystems comprise a first storage subsystem 202 and a second storage subsystem 204, wherein a primary data set 300 is maintained in a storage group, and a backup data set 302 is maintained in a storage group, and wherein the backup data set 302 stores a copy of data stored in the primary data set 300. In certain embodiments, the primary data set 300 is stored in the first storage subsystem 202 and the backup data set 302 is stored in the second storage subsystem 304. The plurality of storage groups is adjusted (at block 706) based on usage statistics of data, wherein the usage statistics are stored in the log file 116, and based on properties and organization of the data stored in a plurality of data structures 118, such as, the storage classes 122, the data classes 124, and the management classes 126 stored in exemplary SMS constructs.

Therefore, FIGS. 1-7 illustrate certain embodiments in which a plurality of storage groups 114 are generated from storage devices 108a . . . 108m, 110a . . . 110p that are distributed among a plurality of storage subsystems 104a . . . 104n. Various embodiments that update the storage groups 114 and provide display information corresponding to the storage groups 114 are also illustrated in FIGS. 1-7.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
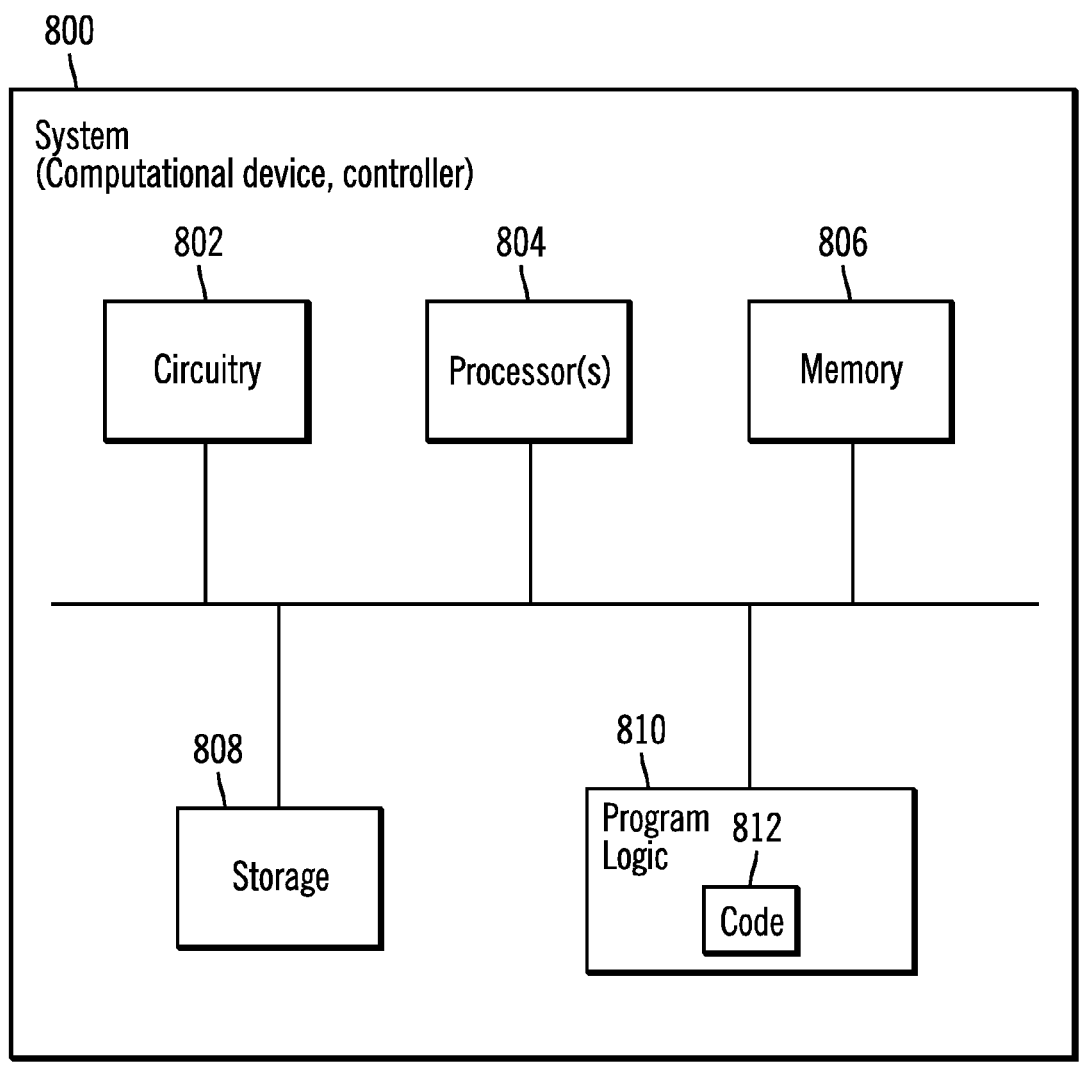
FIG. 8 illustrates a block diagram that shows certain elements that may be included in the controller of the computing environment of FIG. 1, in accordance with certain embodiments.

FIG. 8 illustrates a block diagram that shows certain elements that may be included in the controller 102 in accordance with certain embodiments. One or more of the controllers 102 either individually or collectively may also be referred to as a system 800 and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising:
maintaining, by a controller, a plurality of storage subsystems that are coupled to the controller, wherein a first storage subsystem has a first plurality of storage devices and a second storage subsystem has a second plurality of storage devices, wherein at least two storage devices of the first plurality of storage devices have different storage capacities;
generating, by the controller, a plurality of storage groups, wherein a selected storage group comprises a first set of storage devices selected from the first plurality of storage devices of the first storage subsystem, and a second set of storage devices selected from the second plurality of storage devices of the second storage subsystem, wherein the first set of storage devices is fewer in number than the first plurality of storage devices of the first storage subsystem, wherein the second set of storage devices is fewer in number than the second plurality of storage devices of the second storage subsystem, wherein a primary data set is maintained in the first set of storage devices and a backup data set is maintained in the second set of storage devices, and wherein the first set of storage devices that maintains the primary data set is different in number than the second set of storage devices that maintains the backup data set; and
in response to data being written onto and read from the plurality of storage groups over a period of time, adjusting, by the controller, the plurality of storage groups, based on usage statistics of the data, wherein the usage statistics are stored in a log file, and properties and organization of the data stored in a plurality of data structures that comprise storage management system constructs that include a plurality of storage classes, a plurality of data classes, and a plurality of management classes, wherein the adjusting comprises at least one of changing an amount of storage space in the plurality of storage groups, and adding, removing, or replacing one or more selected storage devices in the plurality of storage groups, and wherein the method further comprises: generating the plurality of storage classes from the log file, wherein a storage class provides at least a first indicator that indicates whether the data is critical; generating the plurality of data classes from the log file, wherein a data class provides at least a second indicator that indicates whether the data is compressed; and generating the plurality of management classes from the log file, wherein a management class provides at least a third indicator that indicates whether the data is to be backed up.

2. The method of claim 1, wherein the adjusting of the plurality of storage groups is performed in response to:
(i) addition of new storage devices in the plurality of storage subsystems;
(ii) updated storage requirements indicated by a user; and
(iii) an analysis of the log file that maintains the usage statistics, wherein the analysis of the log file provides an indication that the adjusting of the plurality of storage groups is desirable.

3. The method of claim 1, wherein the adjusting further comprises adding new storage groups, the method further comprising:
performing query operations, by a grouping application, to discover which storage devices are available to the controller;
displaying, by the grouping application, a graphical user interface to query a user regarding how many storage groups what size storage groups are required by the user, wherein the generating by the controller of the plurality of storage groups is performed subsequent to the displaying.

4. The method of claim 3, wherein subsequent to the generating, performing:
using the controller by a host to read and write data with respect to the plurality of storage groups; and
updating the log file by the grouping application.

5. A system, comprising:
a memory; and
a processor coupled to the memory, wherein the processor performs operations, the operations comprising:
maintaining a plurality of storage subsystems that are coupled to the controller, wherein a first storage subsystem has a first plurality of storage devices and a second storage subsystem has a second plurality of storage devices, wherein at least two storage devices of the first plurality of storage devices have different storage capacities;
generating a plurality of storage groups, wherein a selected storage group comprises a first set of storage devices selected from the first plurality of storage devices of the first storage subsystem, and a second set of storage devices selected from the second plurality of storage devices of the second storage subsystem, wherein the first set of storage devices is fewer in number than the first plurality of storage devices of the first storage subsystem, wherein the second set of storage devices is fewer in number than the second plurality of storage devices of the second storage subsystem, wherein a primary data set is maintained in the first set of storage devices and a backup data set is maintained in the second set of storage devices, and wherein the first set of storage devices that maintains the primary data set is different in number than the second set of storage devices that maintains the backup data set; and
in response to data being written onto and read from the plurality of storage groups over a period of time, adjusting, by the controller, the plurality of storage groups, based on usage statistics of the data, wherein the usage statistics are stored in a log file, and properties and organization of the data stored in a plurality of data structures that comprise storage management system constructs that include a plurality of storage classes, a plurality of data classes, and a plurality of management classes, wherein the adjusting comprises at least one of changing an amount of storage space in the plurality of storage groups, and adding, removing, or replacing one or more selected storage devices in the plurality of storage groups, and wherein the operations further comprise: generating the plurality of storage classes from the log file, wherein a storage class provides at least a first indicator that indicates whether the data is critical; generating the plurality of data classes from the log file, wherein a data class provides at least a second indicator that indicates whether the data is compressed; and generating the plurality of management classes from the log file, wherein a management class provides at least a third indicator that indicates whether the data is to be backed up.

6. The system of claim 5, wherein the adjusting of the plurality of storage groups is performed in response to:
   (i) addition of new storage devices in the plurality of storage subsystems;
   (ii) updated storage requirements indicated by a user; and
   (iii) an analysis of the log file that maintains the usage statistics, wherein the analysis of the log file provides an indication that the adjusting of the plurality of storage groups is desirable.

7. The system of claim 5, wherein the adjusting further comprises adding new storage groups, the operations further comprising:
   performing query operations, by a grouping application, to discover which storage devices are available to the controller;
   displaying, by the grouping application, a graphical user interface to query a user regarding how many storage groups what size storage groups are required by the user, wherein the generating by the controller of the plurality of storage groups is performed subsequent to the displaying.

8. The system of claim 7, wherein subsequent to the generating, performing
   using the controller by a host to read and write data with respect to the plurality of storage groups; and
   updating the log file by the grouping application.

9. A non-transitory computer readable storage medium, wherein code stored in the computer readable storage medium when executed by a processor included in a controller causes operations, the operations comprising:
   maintaining, by the controller, a plurality of storage subsystems that are coupled to the controller, wherein a first storage subsystem has a first plurality of storage devices and a second storage subsystem has a second plurality of storage devices, wherein at least two storage devices of the first plurality of storage devices have different storage capacities;
   generating, by the controller, a plurality of storage groups, wherein a selected storage group comprises a first set of storage devices selected from the first plurality of storage devices of the first storage subsystem, and a second set of storage devices selected from the second plurality of storage devices of the second storage subsystem, wherein the first set of storage devices is fewer in number than the first plurality of storage devices of the first storage subsystem, wherein the second set of storage devices is fewer in number than the second plurality of storage devices of the second storage subsystem, wherein a primary data set is maintained in the first set of storage devices and a backup data set is maintained in the second set of storage devices, and wherein the first set of storage devices that maintains the primary data set is different in number than the second set of storage devices that maintains the backup data set; and
   in response to data being written onto and read from the plurality of storage groups over a period of time, adjusting, by the controller, the plurality of storage groups, based on usage statistics of the data, wherein the usage statistics are stored in a log file, and properties and organization of the data stored in a plurality of data structures that comprise storage management system constructs that include a plurality of storage classes, a plurality of data classes, and a plurality of management classes, wherein the adjusting comprises at least one of changing an amount of storage space in the plurality of storage groups, and adding, removing, or replacing one or more selected storage devices in the plurality of storage groups, and wherein the operations further comprise: generating the plurality of storage classes from the log file, wherein a storage class provides at least a first indicator that indicates whether the data is critical; generating the plurality of data classes from the log file, wherein a data class provides at least a second indicator that indicates whether the data is compressed; and generating the plurality of management classes from the log file, wherein a management class provides at least a third indicator that indicates whether the data is to be backed up.

10. The computer readable storage medium of claim 9, wherein the adjusting of the plurality of storage groups is performed in response to:
    (i) addition of new storage devices in the plurality of storage subsystems;
    (ii) updated storage requirements indicated by a user; and
    (iii) an analysis of the log file that maintains the usage statistics, wherein the analysis of the log file provides an indication that the adjusting of the plurality of storage groups is desirable.

11. The computer readable storage medium of claim 9, wherein the adjusting further comprises adding new storage groups, the operations further comprising:
    performing query operations, by a grouping application, to discover which storage devices are available to the controller;
    displaying, by the grouping application, a graphical user interface to query a user regarding how many storage groups what size storage groups are required by the user, wherein the generating by the controller of the plurality of storage groups is performed subsequent to the displaying.

12. The computer readable storage medium of claim 11, wherein subsequent to the generating, performing:
    using the controller by a host to read and write data with respect to the plurality of storage groups; and
    updating the log file by the grouping application.

13. A method for deploying computing infrastructure, comprising integrating computer-readable code into a controller, wherein the computer-readable code in combination with the controller is capable of performing:
    maintaining, by the controller, a plurality of storage subsystems that are coupled to the controller, wherein a first storage subsystem has a first plurality of storage devices and a second storage subsystem has a second plurality of storage devices, wherein at least two storage devices of the first plurality of storage devices have different storage capacities;
    generating, by the controller, a plurality of storage groups, wherein a selected storage group comprises a first set of storage devices selected from the first plurality of storage devices of the first storage subsystem, and a second set of storage devices selected from the second plurality of storage devices of the second storage subsystem, wherein the first set of storage devices is fewer in number than the first plurality of storage devices of the first storage subsystem, wherein the second set of storage devices is fewer in number than the second plurality of storage devices of the second storage subsystem, wherein a primary data set is maintained in the first set of storage devices and a backup data set is maintained in the second set of storage devices, and wherein the first set of storage devices that maintains the primary data set is different in number than the second set of storage devices that maintains the backup data set; and in response to data being written onto and read from the plurality of storage groups over a period of time, adjusting, by the controller, the plurality of storage groups, based on usage statistics of the data, wherein the usage statistics are stored in a log file, and properties and organization of the data stored in a plurality of data structures that comprise storage management system constructs that include a plurality of storage classes, a plurality of data classes, and a plurality of management classes, wherein the adjusting comprises at least one of changing an amount of storage space in the plurality of storage groups, and adding, removing, or replacing one or more selected storage devices in the plurality of storage groups, and wherein the computer-readable code in combination with the controller is further capable of performing: generating the plurality of storage classes from the log file, wherein a storage class provides at least a first indicator that indicates whether the data is critical; generating the plurality of data classes from the log file, wherein a data class provides at least a second indicator that indicates whether the data is compressed; and generating the plurality of management classes from the log file, wherein a management class provides at least a third indicator that indicates whether the data is to be backed up.

14. The method for deploying computing infrastructure of claim 13, wherein the adjusting of the plurality of storage groups is performed in response to:
  (i) addition of new storage devices in the plurality of storage subsystems;
  (ii) updated storage requirements indicated by a user; and
  (iii) an analysis of the log file that maintains the usage statistics, wherein the analysis of the log file provides an indication that the adjusting of the plurality of storage groups is desirable.

15. The method for deploying computing infrastructure of claim 13, wherein the adjusting further comprises adding new storage groups, wherein the computer-readable code in combination with the controller is capable of performing operations, the operations comprising:
  performing query operations, by a grouping application, to discover which storage devices are available to the controller;
  displaying, by the grouping application, a graphical user interface to query a user regarding how many storage groups what size storage groups are required by the user, wherein the generating by the controller of the plurality of storage groups is performed subsequent to the displaying.

16. The method for deploying computing infrastructure of claim 15, wherein subsequent to the generating, performing:
  using the controller by a host to read and write data with respect to the plurality of storage groups; and
  updating the log file by the grouping application.

* * * * *